Dec. 6, 1949 A. A. HOLFELDER 2,490,302
MEANS FOR REMOVING EMBEDDED MATERIAL
Filed April 7, 1944 2 Sheets-Sheet 1
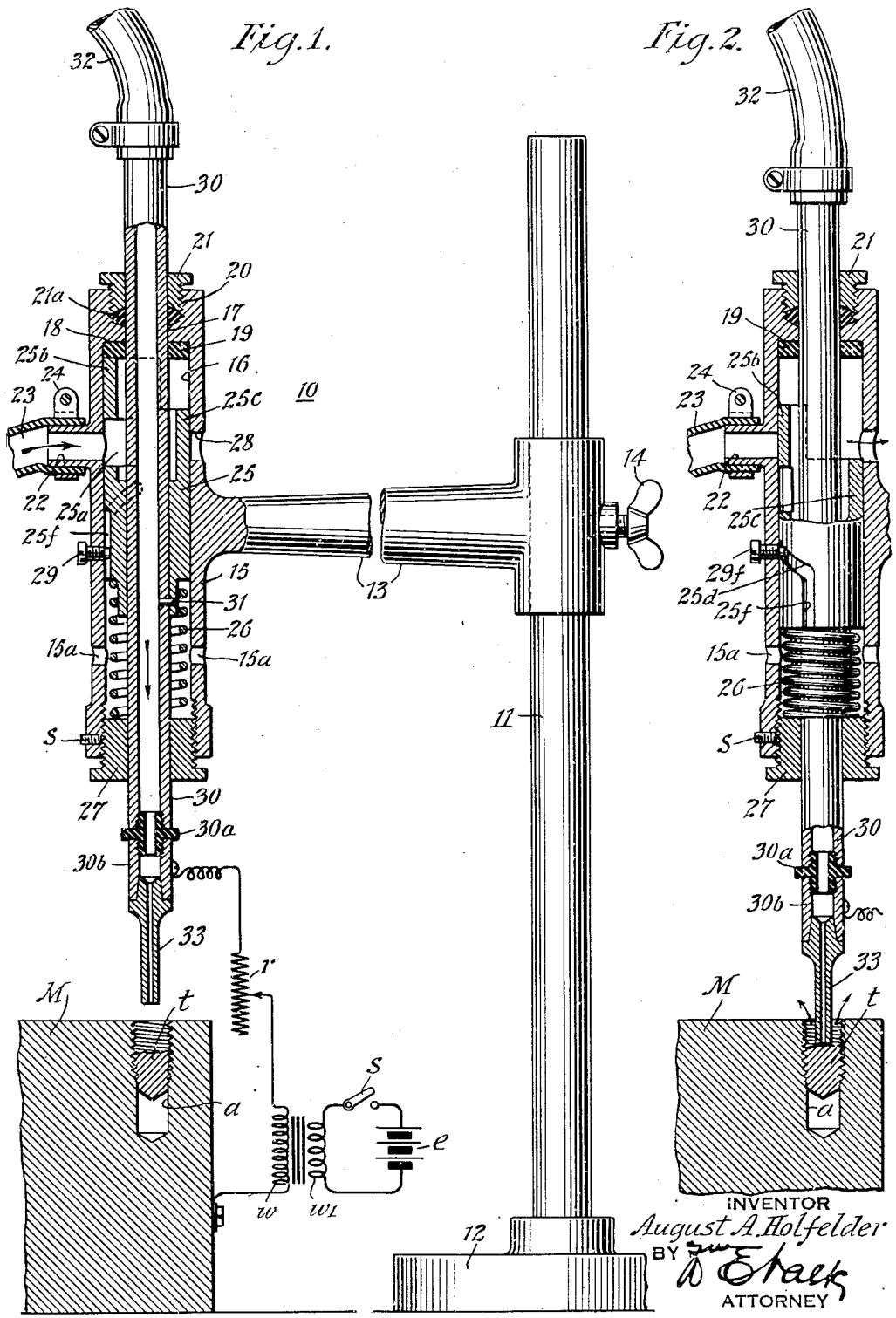
INVENTOR
August A. Holfelder
BY
ATTORNEY Dec. 6, 1949         A. A. HOLFELDER              2,490,302
              MEANS FOR REMOVING EMBEDDED MATERIAL
Filed April 7, 1944                              2 Sheets-Sheet 2
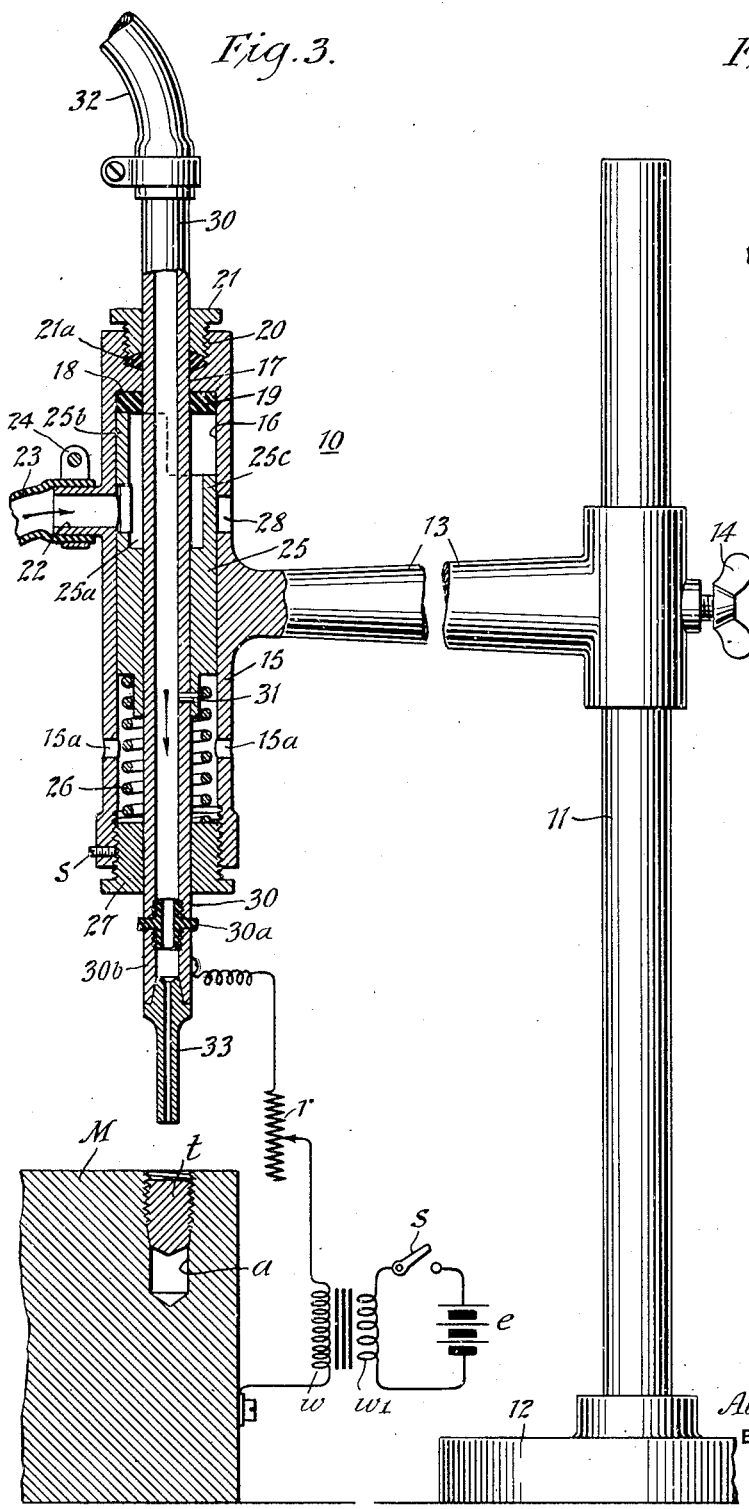
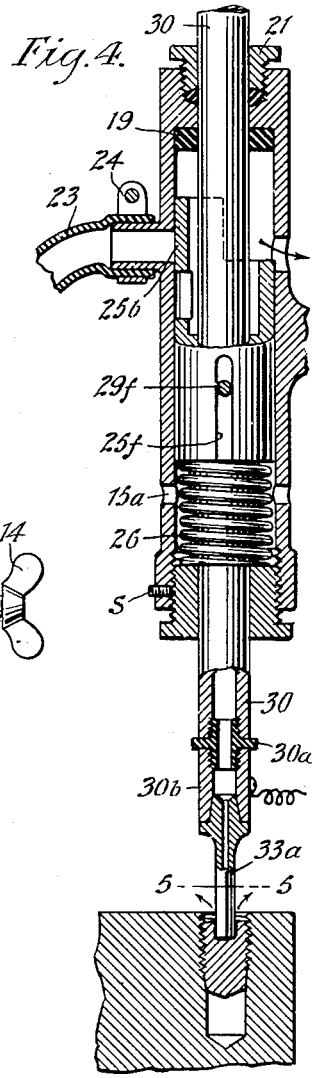
INVENTOR
August A. Holfelder
BY
ATTORNEY Patented Dec. 6, 1949

2,490,302

UNITED STATES PATENT OFFICE 2,490,302

MEANS FOR REMOVING EMBEDDED MATERIAL

August A. Holfelder, Caldwell, N. J., assignor to Curtiss-Wright Corporation, a corporation of Delaware Application April 7, 1944, Serial No. 530,026

1 Claim. (Cl. 219—15)

This invention relates to a method of and means for removing embedded material.

The invention has further reference to a method of and means for removing solid or other material from a structure in which it is embedded.

The principal object of the invention is to provide an improved method and apparatus for carrying out the same whereby metallic objects may be removed from metal parts without damage thereto and without undue wear on the apparatus.

A further object of the invention is to provide an improved method and apparatus for carrying out the method whereby costly and exteriorly precision machined or ground metal parts may be salvaged after metal working tools such as twist drills, screw thread cutting taps, reamers and the like have been inadvertently broken off therein and thereby firmly embedded in the work.

Another object of the invention is to provide an improved method and apparatus for carrying out the method whereby a partly drilled, reamed or screw-threaded hole, for example, is not impaired in the removal therefrom of an embedded broken end of a metal working tool.

A further object of the invention is to provide an improved method and apparatus for carrying out the method whereby metal-working elements broken off within and embedded in the part being worked, may be more efficiently and more speedily removed without injury to the part or, alternatively, so processed that a suitable socket wrench, screw driver blade or other tool whose shape corresponds to the shape of the aperture or recess processed centrally within the embedded object, in accordance with the invention, may be readily removed manually with the aid of such tools without injury to the part.

In accordance with the invention, the tip of an electrode is intermittently moved into and out of engagement with the embedded material automatically while at the same time oscillating with respect thereto, a suitable arrangement being provided for passing electrical current through said material while the electrode tip is in engagement therewith.

The invention relates particularly to an electrode comprising a heat-resistant nozzle or tip adapted for passage therethrough of a suitable cooling medium such as air under pressure while it is maintained in a fixed centrally aligned position relative to the material being worked upon and at the same time adapted to be reciprocated vertically and oscillated simultaneously after the tip has been initially brought into contacting engagement with the material to be removed from the work-piece or part.

Various other objects, advantages and features of the invention will become apparent from the following detailed description.

The invention resides in the method of and means for removing embedded material, the combinations and arrangements of the character hereinafter described and claimed.

For an understanding of the invention and for an illustration of some of the forms thereof, reference is to be had to the accompanying drawings in which:

Figure 1 is an elevational view partly in section illustrating a preferred embodiment of the invention shown set-up and positioned relative to a piece of work including a schematic representation of a circuit therefor;

Fig. 2 is a similar view in section illustrating the invention in contacting engagement with an object embedded in a piece of work;

Fig. 3 is a view similar to Fig. 1 illustrating a modified form of the invention wherein the electrode is only adapted to be reciprocated vertically and, as shown, in its full up-stroke position;

Fig. 4 is a similar fragmentary sectional view illustrating the electrode in down-stroke position and in contact with an object embedded in a piece of work;

Fig. 5 is a transverse sectional view taken on the line 5—5 of Fig. 4; and

Fig. 6 is a transverse sectional view illustrating a modification of Fig. 5.

Referring to the drawings and to Fig. 1 in particular, a portable, pneumatically operated, tool or fixture, generally indicated at 10, comprises a tool post or standard 11 having a base member or plate 12 secured to one end thereof whereby said standard 11 may, for example, be supported in an upright position or clamped to a suitable supporting surface in a horizontal position.

The aforesaid post or standard 11 is provided with a laterally extending bracket arm 13 slidable therealong and adapted to be secured in a predetermined position of adjustment by means of a clamping or set screw 14 as will be understood. The opposite end portion of the said bracket arm 13 terminates in a vertically disposed tubular or cylindrical member 15 having a central bore 16 extending from its lowermost end to a point adjacent its uppermost end where said bore 16 terminates in a relatively small bore 17 whereby an annular shoulder 18 is formed as clearly shown on the drawing, this shoulder being adapted to serve as an abutment which is preferably faced with a washer 19 of suitable resilient material to provide a cushioned stop for a reciprocatory member hereinafter described. The uppermost end of the aforesaid bore 17 is suitably counterbored and provided with a screw thread 20 with which coacts a gland nut 21 adapted to engage and compress a packing ring 21a.

The cylindrical member 15 is further provided intermediate its ends with a laterally extending tubular projection 22 which provides an inlet passage or port for air under pressure as hereinafter described, said projection 22 being further adapted for the attachment thereto of a suitable air-pressure hose 23 by a suitable clamp 24.

Disposed for free reciprocatory movement in the bore 16 of the member 15 is a piston 25 engaged at its lower end by one end of a helical spring 26 which, at its other end, is seated against a nut 27 threaded into the lower end of the member 15. The piston 25 is shaped to provide an upper chamber 25a into which air under pressure is admitted through the tubular projection 22. Further, the piston 25 comprises upper sections 25b and 25c adapted to coact respectively, and in closing relation, with the passage defined by the tubular projection 22 and a discharge port 28 formed in the cylindrical member 15. Still further, in accordance with the invention, the exterior surface of the piston 25 comprises a cam slot 25d with which is coactable the end of a screw 29 threaded through the cylindrical member 15.

Extending through the axial passage defined by the piston 25 is a tube 30, this member and the tube being suitably secured together, as by a pin 31. The tube 30 extends through and is related, in free slidable manner, to the nut 27, the shoulder 18, the bore 17, the ring 21a and the nut 21. One end of the tube 30 has connected thereto one end of a hose 32, or equivalent, adapted to be traversed by air or other suitable cooling medium. The other end of the tube 30 has secured thereto in suitable detachable manner a tubular electrode tip 33 formed from suitable heat-resistant metal such, for example, as a molybdenum compound known in the art as "100 M. Elkonite," by means of a shouldered, tubular coupling member 30a, of non-metallic material which is screw threaded into and between one end of a short, tubular end portion 30b, carrying the electrode 33 and the upper major portion of the tube 30 as clearly shown in the drawings.

Referring to Figs. 1, 2, 3, I have shown a metallic structure M having a passage a formed in the top thereof, this passage being threaded in the customary manner by a tap t which, especially when of small diameter, is apt to be broken in such manner that the lower end of the tap remains in the passage a as indicated on the drawing. In lieu of a tap t, it will be understood that any metallic member such as a broken metal-working tool as hereinbefore referred to may be seated in the passage a. Hereinafter, the term "tool" shall be understood as generically referring to and including such metallic member, broken tool or equivalent.

Referring particularly to Fig. 1, the metallic structure M is shown as having one terminal of a transformer winding w secured thereto the other terminal of this winding being connected in suitable manner to the aforesaid tubular end portion 30b, the connection including a rheostat or adjustable resistance r. The other transformer winding w1 is included in circuit with a suitable source of electrical energy e and a switch s. Preferably, although not necessarily, the transformer arrangement described above is a "Martindale Etchograph," model A, 110 volts, 60 cycles, A. C.

Inasmuch as a relatively small voltage, derived from the aforesaid transformer, is utilized for the purpose of this invention, the electrode tip 33 is, as noted above, insulated from the tube 30 and the apparatus generally, by means of the coupling sleeve 30a, in order to concentrate electric current at the point of operation as herein described. Moreover, insulating the electrode 33 from the rest of the apparatus precludes possible shock to the operator and also short circuiting the apparatus when in operation.

In accordance with my invention, the metallic structure M and the base member 12 are related to each other in such manner that the longtiudinal axis of the electrode tip 33 coincides with the longitudinal axis of the passage a. Thereupon, after the switch s has been closed, air from a suitable source thereof under pressure is caused to traverse the hose 23 with consequent entry thereof into the chamber 25a of the piston 25. At the same time, air under pressure or other suitable cooling medium is caused to traverse the hose 32, the tube 30 and the electrode tip 33.

When the chamber 25a is subjected to air under pressure, as stated, the piston 25 is moved downwardly until the electrode tip 33 engages the tool t, air escaping from the chamber in advance of the piston 25 through the passages 15a. When this happens, the electrical circuit is completed and an arc is produced to thereby burn away some of the material from said tool t. The arrangement is such, as obtained by adjustment of the set screw 14 that, when the electrode tip 33 initially engages the tool t, the piston 25 takes a position as shown in Fig. 2 wherein the valve section 25b closes the passage defined by the tubular projection 22 and the valve section 25c opens the discharge port 28. Thereupon, under the influence of the spring 26, the piston 25 immediately returns to the position thereof shown in Fig. 1. As this happens, the piston section 25c closes the discharge port 28 and the valve section 25b again uncovers the tubular projection 22 to admit air into the chamber 25a, whereupon the piston 25 again descends to cause the electrode tip 33 to engage the tool t. By reason of the fact that some of the embedded material was burned away on the previous excursion of the electrode 33, it follows that this second electrode stroke is slightly longer than the first stroke. This happens due to the fact that the spring 26 has the function, not only of automatically returning the parts to the position shown in Fig. 1, but of permitting the stroke of the electrode to increase as required throughout the practical operating range of the disclosed apparatus. Therefore, provided that the arm 13 is positioned initially in proper manner on the standard 11, the spring 26 is always effective to cause the electrode tip 33 to engage the tool t with sufficient force to provide good electrical contact between said tip 33 and said tool t.

Each time that the arrangement comprising the piston 25, the tube 30 and the electrode tip 33 moves downwardly, the screw 29 and the cam groove 25d coact to produce turning movement of said arrangement, this being effective while the electrode tip 33 is in engagement with the tool t. This is advantageous because increasing the rate at which the embedded material is consumed by the arcing action.

As the operation proceeds, air or other cooling medium passes continuously from the hose 32 through the tube 30 and the electrode tip 33. This cooling medium is directed by the electrode tip 33 directly on that area of the tool t which is subjected to the arcing action with resultant desired dissipation, from the electrode tip 33 and the tool t, of the heat which is generated by such arcing action. In addition, the cooling medium has the desirable function of forcibly expelling particles of material from the passage a.

It will be observed that the diameter of the electrode tip 33 is somewhat smaller than the diameter of the passage a. The tubular member 15 positively guides the piston 25 together with the thereby-supported parts for movement upwardly and downwardly in a vertical direction. Hence, the lower end of the electrode tip 33 intermittently engages the tool t and does not inadvertently engage the threads formed on the interior surface of the passage a. Due to this positive control on the movement of the electrode, the aforesaid threads are not subjected to the arcing effect which is localized in the desired area.

Ordinarily, reciprocation of the electrode as described causes the formation of an internal passage in the tool t. Usually, the surrounding material collapses into this passage and is either burned away or expelled by action of the blast of air or other cooling medium. However, under some circumstances, it may be necessary to remove the apparatus and use a suitable tool to disintegrate the material surrounding the passage which is thus burned into the tool t.

As hereinbefore described with respect to Figs. 1 and 2, the arrangement is such, as obtained by the action of the screw 29 on the cam slot 25d, that the electrode tip 33 is subjected to rotative movement while in engagement with the tool t. This is an advantageous and preferred arangement but, under some circumstances, it may be desirable that the electrode tip 33 be subjected to reciprocatory motion solely and, if so, there is no rotative movement of said electrode tip 33 while in engagement with the tool t.

An arrangement constructed in accordance with the invention last described is illustrated in Fig. 3, this corresponding identically with the arrangement of Figs. 1 and 2 with the exception that the cam slot 25d is omitted from the piston 25. Hence, it will be understood that the arrangement of Fig. 3 operates automatically to impart reciprocatory, non-rotatable motion to the electrode tip 33.

Referring to Fig. 4, I have illustrated a modified form of the invention wherein the piston 25 comprises, in lieu of the cam slot 25d, a slot 25f which extends vertically in parallel relation with respect to the longitudinal axis of the tube 30. The tubular member 15 carries a screw 29f, similar to the screw 29, which coacts with the slot 25f to positively prevent rotation of the tube 30 and the electrode tip 33a during reciprocation of this assembly.

A feature of the invention as disclosed in Fig. 4, resides in the fact that the electrode tip 33a, instead of being round, has a polygonal exterior surface such, for example, as a hexagonal surface, Fig. 5, or a square surface, Fig. 6. With the arrangement of Fig. 4, it will be understood that the electrode tip 33a reciprocates in a vertical direction only, this control being positively maintained by reason of the control effected by the screw 29f on the vertical slot 25f. In so doing, an internal passage is formed in the tool t, and this passage takes the configuration imparted thereto by the electrode tip 33a. Hence, after such passage has been formed to a suitable depth, the apparatus may be moved aside and a suitable wrench applied to the tool t to unthread the same from the passage a.

In the form of the invention as disclosed, reciprocation and rotatable movement of the tube 30 and the thereby-carried electrode tip 33 or 33a is obtained by operation of the piston 25 which, in effect, is the movable part of a pneumatic motor. It shall be understood that the invention is not to be limited to such pneumatic control of the electrode tip. As well, if desired, reciprocation and/or turning motion of the electrode tip may be obtained under electric motor control, and, within the purview of the claim, it is to be understood that the invention relates to pneumatic, electric motor or other equivalent control arrangements.

It will be understood that, if desired, the piston 25 in the form of the invention disclosed in Fig. 3 may comprise a vertical slot 25f with which coacts a screw 29f threaded to the tubular casing 15.

Referring more particularly to the hereinbefore described cooling medium, it is to be noted that air under pressure, when supplied to the electrode tip 33, is preferably under such pressure that burned particles may be positively expelled from the passage a where they might otherwise accumulate to some extent at least and become welded to the remaining portion of the tool, the tip end of the electrode 33 or to the threads in the said passage a. Moreover, it is highly desirable that the cooling medium supplied to the electrode tip 33 be in such volume that the temperature of the part or article and particularly surfaces thereof in the region of the broken tool, will not be raised above 100° F. during a tool removing operation.

While air under suitable pressure has been described as utilizable in connection with the hereindescribed invention, it is to be observed that any suitable gas or mixture of gases in various proportions adapted to react with tool material, as herein described, while electrically energized, may be utilized in lieu of air under pressure.

As hereinbefore described, the cooling medium introduced into the aforesaid tube 30 ordinarily may be air under pressure and preferably at thirty-five pounds more or less. However, the air pressure utilized to reciprocate the aforesaid piston 25 is preferably controlled by a reducing valve (not shown) in order that the frequency of the electrode excursions into and out of contact with the tool may be raised or lowered as desired.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claim to cover all such changes and modifications.

What is claimed as new and desired to be secured by Letters Patent is:

An apparatus for removing metal from a structure by a burning action, a sleeve having inlet and outlet ports, means for supporting said sleeve in operative position with respect to said structure, a piston reciprocable in said sleeve, an electrode carried by said piston for movement toward and from said structure, a spring for moving said piston from said structure, means for passing air under pressure into said sleeve at one side of said piston to thereby move said electrode into engagement with the metal to be burned, and means for alternately covering and uncovering said inlet and outlet ports, said apparatus being adapted to have associated therewith means for establishing an arc between said electrode and the metal to be burned.

AUGUST A. HOLFELDER.

REFERENCES CITED

The following references are of record in the file of this patent:

UNITED STATES PATENTS

| Number | Name | Date |
|---|---|---|
| 650,124 | Coleman | May 22, 1900 |
| 1,242,171 | Geisenhoner | Oct. 9, 1917 |
| 1,281,454 | White | Oct. 15, 1918 |
| 1,318,147 | Herrick | Oct. 7, 1919 |
| 1,324,337 | Chapman et al. | Dec. 9, 1919 |
| 1,984,809 | Requa | Dec. 18, 1934 |
| 1,995,001 | Ito | Mar. 19, 1935 |
| 2,001,688 | Paugh | May 14, 1935 |
| 2,079,310 | Bennett | May 4, 1937 |
| 2,385,665 | Warwich | Sept. 25, 1945 |